United States Patent
Dellacorna et al.

(10) Patent No.: US 9,232,611 B2
(45) Date of Patent: Jan. 5, 2016

(54) MODULAR CONSTANT CURRENT REGULATOR

(71) Applicant: ADB BVBA, Zaventem (BE)

(72) Inventors: Lorenzo Dellacorna, Lodi (IT); Federico Canetta, Milan (IT)

(73) Assignee: ADB BVBA (BE)

( * ) Notice: Subject to any disclaimer, the term of this patent is extended or adjusted under 35 U.S.C. 154(b) by 0 days.

(21) Appl. No.: 14/394,910

(22) PCT Filed: Jun. 26, 2013

(86) PCT No.: PCT/EP2013/063421
§ 371 (c)(1),
(2) Date: Oct. 16, 2014

(87) PCT Pub. No.: WO2014/001402
PCT Pub. Date: Jan. 3, 2014

(65) Prior Publication Data
US 2015/0123554 A1    May 7, 2015

(30) Foreign Application Priority Data

Jun. 27, 2012   (EP) .................................... 12173866

(51) Int. Cl.
*H05B 37/02*       (2006.01)
*H05B 39/00*       (2006.01)
(Continued)

(52) U.S. Cl.
CPC ............ *H05B 37/0209* (2013.01); *H02M 5/225* (2013.01); *H02M 5/42* (2013.01); *H05B 39/00* (2013.01)

(58) Field of Classification Search
CPC .... H05B 37/00; H05B 37/02; H05B 37/0209; H05B 39/00; H02M 5/225; H02M 5/42
USPC ............. 315/206, 224, 227 R, 276, 279, 291, 315/307, 312
See application file for complete search history.

(56) References Cited

U.S. PATENT DOCUMENTS 6,023,155 A  *  2/2000  Kalinsky ................... G05F 1/56
                                                          323/274

(Continued)

FOREIGN PATENT DOCUMENTS

EP             1 063 758 A2    12/2000
EP    PCT/EP2007/060707         4/2008
(Continued)

OTHER PUBLICATIONS

Input-series Output-parallel AC/AC Converter by Hu Wei, Li Lei, College of Power Engineering, Nanjing University of Science and Technology, Nanjing Jiangsu Province, China / 2010 5th IEEE Conference on Industrial Electronics and Applications.

*Primary Examiner* — Jimmy Vu
(74) *Attorney, Agent, or Firm* — Black McCuskey Souers & Arbaugh, LPA

(57) ABSTRACT

Constant current regulator (10) for supplying a series circuit (9) of a lighting installation with an output electrical power corresponding to a predetermined output power, comprising a plurality of modules (13) electrically connectable for simultaneous operation to jointly provide the output power, the modules being each configured for providing a module output power contributing to the output power of the regulator. Each module comprises its proper transformer (135) for providing galvanic insulation as required by local standards, and a microcontroller (231) for controlling operation of the module. The constant current regulator comprises a data communication network (17) configured to be connected to the microcontrollers (231) of the modules (13), wherein the microcontrollers (231) are operable to exchange data over the data communication network (17) so as to make the constant current regulator (10) modular, meaning that one or more of such modules (13) can be added to or removed from the constant current regulator.

20 Claims, 3 Drawing Sheets

(51) Int. Cl.
*H02M 5/22* (2006.01)
*H02M 5/42* (2006.01)

(56) References Cited

U.S. PATENT DOCUMENTS 6,314,009 B1 11/2001 Dittmer et al.

2002/0074862 A1 6/2002 Saga et al.
2011/0121781 A1 5/2011 Burke et al.

FOREIGN PATENT DOCUMENTS

WO WO2008043756 A1 4/2008
WO WO2012066143 A2 5/2012

* cited by examiner

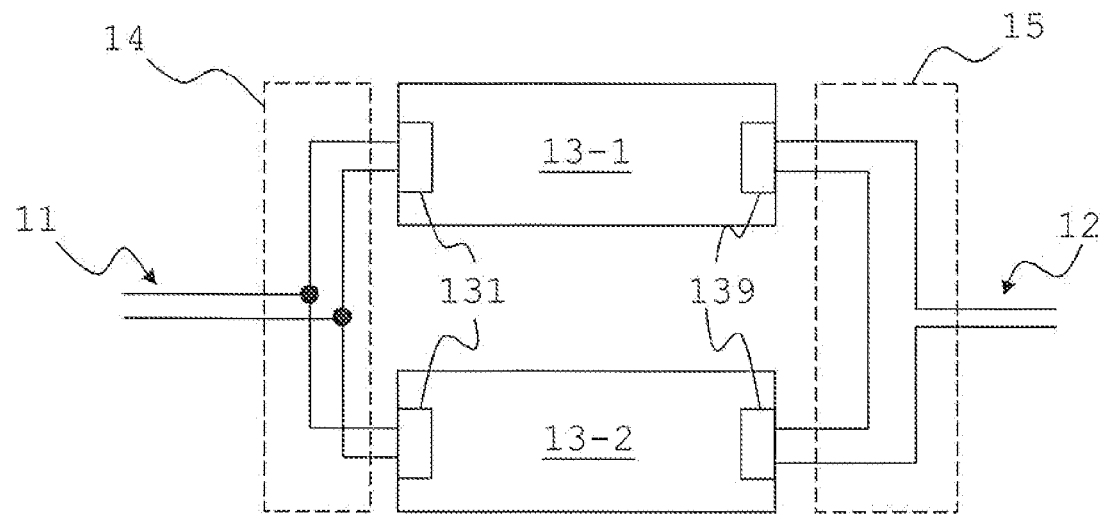
FIG 3A
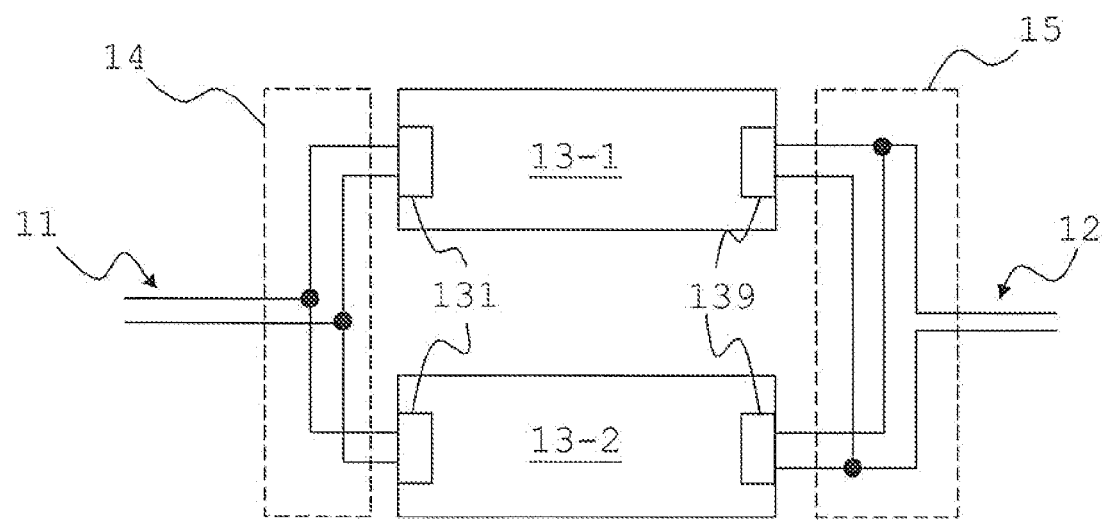
FIG 3B
FIG 3

MODULAR CONSTANT CURRENT REGULATOR

The present invention relates to constant current regulators (CCRs), in particular regulators used for supplying airfield lights with electrical power.

CCRs of the above kind are known from e.g. US 2010/0283400. A CCR's goal is to regulate a current output level around a working point which can e.g. be set by an operator or an airport control tower. The current output level should be as constant as possible near to a pre-set working point in order to ensure that the airfield lights emit at constant luminous intensity. Since it is desirable to use different intensities depending on the circumstances (e.g. day or night, good or low visibility), the working point can change and the CCR must be able to adapt the current output level accordingly.

Airfield lights are typically arranged in long series connections. The length and number of lights in such series and hence the power to be delivered to it can differ between airports, between the type of lights and their use. CCR manufacturers therefore need to provide a wide range of CCRs, each corresponding to a particular input line voltage and frequency, output current and equipment power. This leads to a large number of different CCR product items, which increases stocks, manufacturing resources and cost.

CCR reliability is another aspect, since it is an important safety issue. It is known to have complete backup CCR units installed at airports, which requires a huge additional space and leads to a significant cost increase.

An attempt to tackle the reliability issue is described in US 2010/026207 by providing a twin voltage conversion unit connected in cascade to a common transformer operating at grid frequency (50/60 Hz). The idea here is to add a redundant (non-operating) voltage conversion unit, which is easily replaceable. In the event of a failure, the operating and non-operating voltage conversion units can be switched automatically, such that the broken part can be replaced later during a maintenance service.

The same document describes that it is not excluded to use the two voltage conversion units contemporarily for the operation of the CCR, but fails to teach how the co-operation is to be carried out. Additionally, the document describes a common control unit for controlling operation of the voltage conversion units and for activating switches configured to activate and deactivate one or the other voltage conversion unit.

The system of US 2010/026207 is more reliable, but at an increased expense per CCR unit, since each CCR unit will now have an additional voltage conversion unit identical to the one already present.

Hu Wei et al., in "Input-series output-parallel AC/AC converter", 2010 5th IEEE Conference on industrial electronics and applications, 1 Jun. 2010, pages 1018-1022 describes a two-level AC/AC converter with a high frequency link, which can be used in applications with high input voltage and relatively low output voltage. Such a circuit is not applicable to airfield lighting installations due to its limited power. Furthermore, a disadvantage is that it is not reliable, since operation of both levels is required for obtaining a desired output.

EP 1063758 describes a power supply device comprising a plurality of resonance type switching converters arranged in parallel. Such devices allow for supplying a large power to a load. However, the described devices feature a DC output voltage, which is not workable for an airfield lighting installation, since airfield lighting installations must always be provided with AC current for corrosion protection of the cables and connectors, and in order to be able to use transformers to connect the lights to the supply line for lightning protection, independently of the type of lights (incandescent or LEDs).

US 2002/0074862 describes a parallel power source system comprising a plurality of power supply units, so designed that even when one power supply unit fails, the other power supply unit can ensure power supply. The described system, however, generates DC outputs from AC input supply voltages and cannot therefore be used for supplying airfield lighting installations. Each power supply unit comprises a high frequency transformer supplied with a high frequency pulse current to its primary coil.

It is an aim of the present invention to provide a constant current regulator which overcomes the above drawbacks. In particular, it is an aim to provide a CCR which does not only address the reliability issue, but also the economical issue. It is an aim to provide a CCR which has at least a same, and possibly better reliability. It is also an aim of the invention to provide a CCR which is more economical to manufacture. Yet another aim of the present invention is to provide a CCR which has an increased lifetime and operates more efficiently.

In the view of the present inventors, system reliability can be increased beyond the above proposed solutions, while obtaining an economy in manufacturing costs by building the CCR modularly with a plurality of identical modules, each module being in fact a CCR of its own.

According to the invention there is therefore provided a constant current regulator as set out in the appended claims. The CCR comprises a plurality of advantageously identically rated modules, each module being configured to provide a module output current and voltage which contributes to the CCR's output power. According to the invention, each module is in fact a CCR of its own, having its proper transformer and microcontroller. The CCR is provided with a data communication network operable to exchange data between the microcontrollers. The data communication is so organised that one or more modules can advantageously be added to or removed from the CCR without affecting the ability of the other modules to communicate with each other and operate simultaneously to jointly provide the output power. As a result, a CCR is obtained which is modular to full extent, both at the input stage, and the output stage, as well as at the control level.

Whereas in US 2010/026207, modularity is restricted to the voltage conversion unit (i.e. the input stage only), in the present invention modularity applies to all the components of the CCR. An advantage of such modularity is that CCRs with different rated outputs can be assembled based on one and a same CCR module. This drastically decreases the number of different parts that manufacturers need to keep in stock or produce. By way of example, CCRs of all the existing power ratings can be made by using one and a same (small) transformer, thereby obviating the need of having different transformer sizes, from smaller ones to large ones. Since larger quantities of the same transformer can be produced, an economy of scale can be obtained. As an additional advantage, the full modularity enables to achieve increased reliability. Indeed, the CCRs described in US 2010/026207 will fail if the central controller fails, or in case the common output stage fails. This is not the case in CCRs of the present invention, since these stages are included in the modular design. The other documents discussed above do not describe such a modularity either.

Advantageous aspects are set out in the dependent claims.

According to another aspect of the invention, there is provided a module for use in a CCR according to the invention, as set out in the appended claims.

Aspects of the invention will now be described in more detail with reference to the appended drawings, wherein.

FIG. 3 represents input and output connection schemes of the power modules, for the exemplary case of a CCR comprising two power modules. FIG. 3A represents a connection scheme wherein the power modules' outputs are connected in series. FIG. 3B represents a connection scheme wherein the power modules' outputs are connected in parallel.

It will be convenient to note that current and voltage levels indicated in the present description refer to root mean square (rms) values thereof. Therefore 1 A refers to a 1 A rms current and 1 V refers to a 1 V rms voltage.

It will be likewise convenient to note that the term 'rated power', 'rated current', or 'rated voltage' refers to the maximum operating power, current or voltage respectively.

Figure 1:
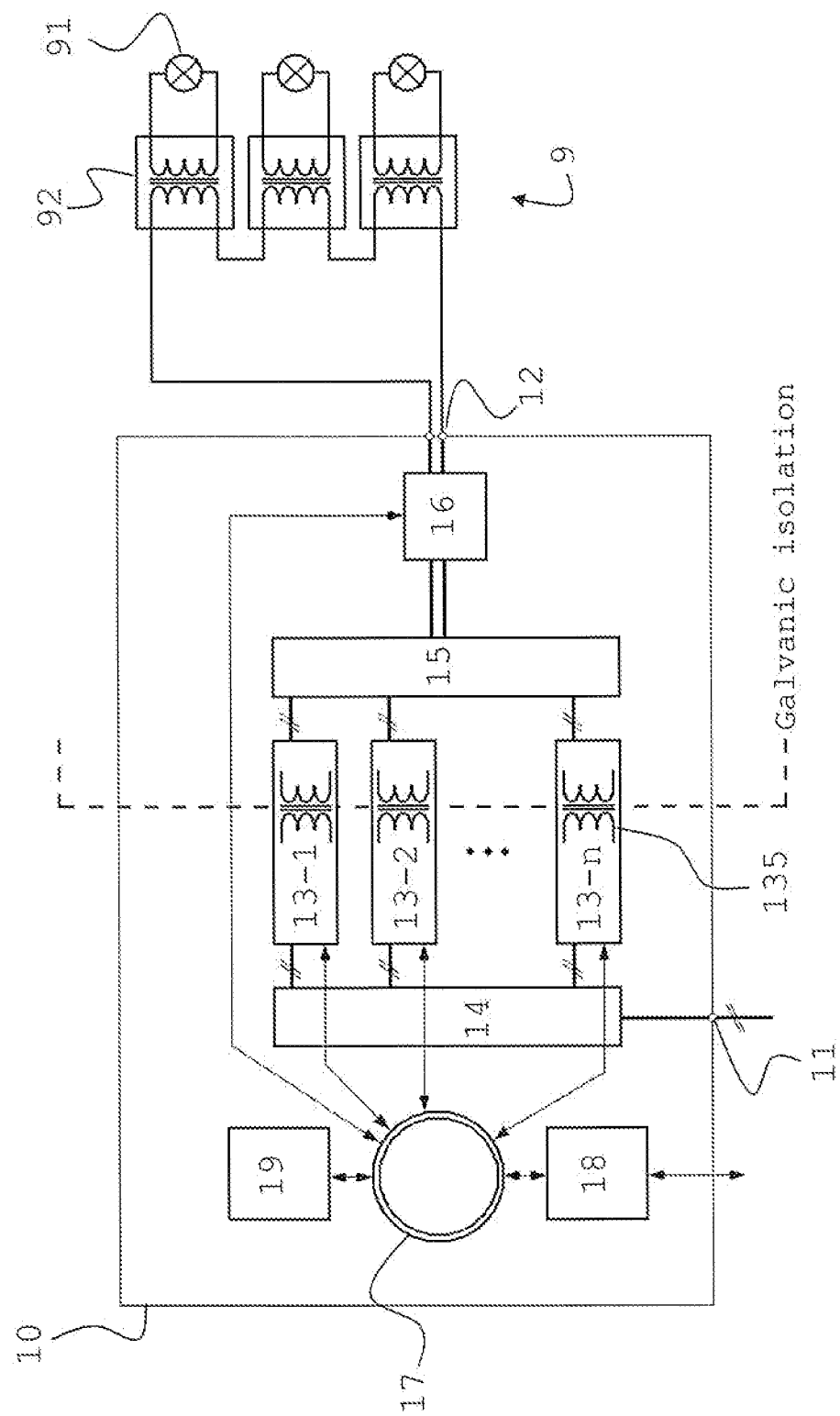
FIG. 1 represents an overall diagram of a CCR according to the invention.

FIG. 1 depicts a schematic diagram of a CCR 10 according to the invention, with power line input 11 for connection to an electrical power network and power output 12 for connection to a series connection 9 of lights. Series connection 9 is typically built up of series circuit transformers 92, the primary coils of which connected in the series 9 and the secondary coils of which connected to the lights 91.

CCR 10 is formed out of modular units 13-1, 13-2 through 13-n, which will be referred to hereinafter as power modules 13. Power modules 13 are connected to the power line input 11 through input power connections 14, forming a wired interface between the power line input 11 and the line input 131 of each power module 13 (see FIG. 2). The power modules are connected to the power output 12 of CCR 10 through output power connections 15.

Input power connections 14 provide for a parallel electrical connection of the modules 13-1 through 13-n to the power line input 11, as is schematically represented in FIG. 3.

Figure 2:
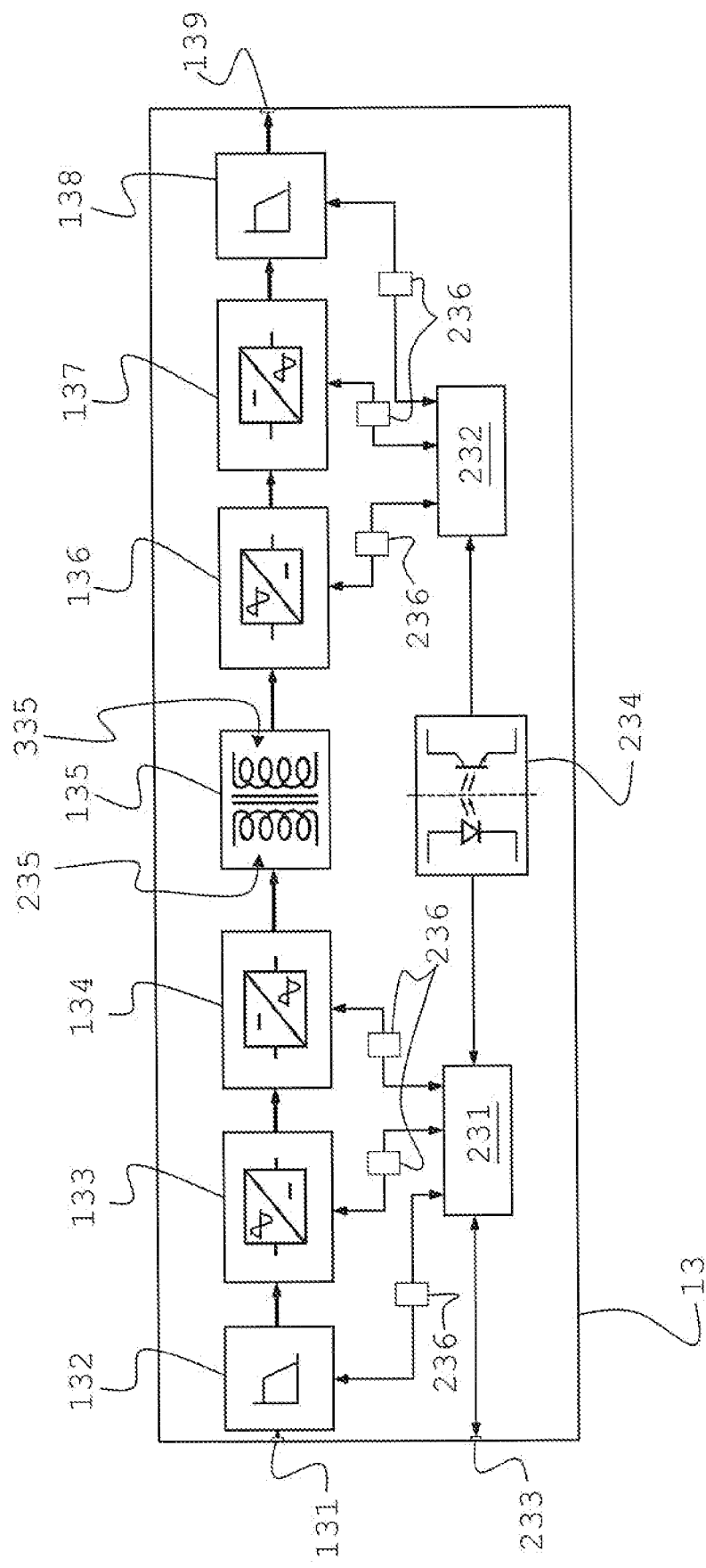
FIG. 2 represents a diagram of a power module of a CCR according to the invention.

Referring to FIG. 2, it will be convenient to note that each power module 13 is in fact a constant current regulator of its own. Power module 13 hence is operable to provide an output power (current and voltage), which can advantageously be directly supplied to the power output 12 of the CCR 10 and hence to the series circuit 9, without any additional galvanic insulation or level correction.

All power modules 13-1 to 13-n are advantageously substantially identical, in that they have identical maximum operating (rated) power, current and voltage. As with every CCR, each power module is also configured to output a power and to generate a current corresponding to pre-set levels. The output voltage is related to the current and to the output resistance and can change between zero and a maximum (rated) voltage.

To do so, a power module 13 advantageously comprises input stage circuits 132-134 and output stage circuits 136-138 galvanically separated, as prescribed by local standards, such as FAA (Federal Aviation Administration) or IEC (International Electrotechnical Commission) standards, by transformer 135. Transformer 135 may for example provide galvanic insulation higher than or equal to 23 kV.

Input stage circuits may comprise a low pass filter 132 for filtering the line input 131 of power module 13.

Input stage circuits comprise a voltage conversion circuit, schematically represented by blocks 133-134 in FIG. 2. Voltage conversion circuit 133-134 is advantageously configured for generating a regulated voltage widely independent of the input voltage level and of the frequency of the input voltage (e.g. mains frequency 50 or 60 Hz). Voltage conversion circuit advantageously comprises a rectifier block 133 followed by a power inverter block 134. Rectifier block 133 can be based on a diode bridge circuit, which is operable to transform an AC (alternating current) signal (such as an advantageously filtered line input, at grid frequency) to a DC (direct current) signal. Power inverter block 134 is operable to transform the DC signal from the rectifier 133 to an AC signal. It therefore advantageously comprises a LLC resonant converter circuit, possibly preceded by a power factor corrector (PFC) circuit, advantageously an interleaving PFC.

The regulated voltage output by voltage conversion circuit 133-134 is advantageously a high frequency AC voltage, such as of at least 1 kHz, advantageously at least 10 kHz, advantageously at least 20 kHz, advantageously at least 25 kHz, advantageously at least 30 kHz. The high frequency AC voltage can be lower than or equal to 100 kHz. The obtention of such high frequency signals can be accomplished by a high frequency LLC quasi resonant converter power circuit. One such LLC quasi resonant converter power circuit is described in an internet paper titled "Phase Shifted Full Bridge LLC Resonant Converter" by Martin Zhang and Sober Hu, and downloadable at the following web page, the contents of which being incorporated herein by reference: http://blog.dianyuan.com/blog/u/42/1150776421.pdf.

An advantage of a high frequency voltage output in the input stage is that size and weight, and hence cost of transformer 135 can be significantly reduced. By way of example, a high frequency transformer working at about 40 kHz is 10 to 20 times smaller in weight and size compared to its 50 Hz counterpart.

Additionally, at the indicated high frequency voltages, the power losses due to the high frequencies remain acceptable, such that an optimal balance between size reduction and power loss is achieved.

The LLC resonant converter circuit is hence connected to the primary side 235 of transformer 135. The secondary side 335 of transformer 135 is connected to the output stage circuits 136-138, which can comprise: a rectifier diode bridge circuit 136 and a transistor H-bridge inverter circuit 137, to provide a regulated module output 139 (current and voltage). H-bridge inverter circuit 137 is advantageously configured for working at a high frequency, such as the ones indicated hereinabove in relation to the voltage conversion circuit 133-134. A low pass filter 138 can be provided between the bridge circuit 137 and module output 139. The regulated output 139 is typically, though not necessarily, a low frequency pure sine wave AC output, at grid frequency of typically 50 or 60 Hz. Regulated outputs of other shapes are possible as well, such as pulsed DC.

The output low pass filter 138 is advantageously operable to filter out any signal components of the above indicated high frequency (i.e. frequency of operation of the rectifier and transistor H-bridge). Operating at such high frequencies is advantageous, since it allows for making the output low pass filter 138 very small and economical compared to output filters used in prior art CCRs, which typically operate at frequencies of a few hundred Hz.

Referring to FIG. 3A, the outputs 139 of power modules 13-1 to 13-n can be connected in series to realize a regulated output current of CCR 10 being maximally the rated output current of one power module, but achieving a higher CCR output power compared to each single power modules, since the regulated CCR output voltage is the sum of the module output voltages. By way of example, considering power modules with 5 kW rated power (on resistive load) with a rated output current of 6.6 A. The rated output voltage of each power module will then be 757 V. Connecting the power modules' outputs in series allows for obtaining a CCR output current of maximum the rated output current of a power module (6.6 A), but at variable power depending on the number of power modules connected in series. Connecting four such power modules in series allows for obtaining a CCR having a rated output power of 20 kW=6.6 A×(4×757 V).

Alternatively, as represented in FIG. 3B, the outputs 139 of power modules can be connected in parallel to obtain a CCR output current being the sum of the power module outputs. By way of example, connecting three of the above power modules in parallel allows for obtaining a maximum rated CCR output current of about 20 A at a voltage level of 757 V.

It is also possible to combine series and parallel connections of power modules, such as a series connection of two groups of two 5 kW modules in parallel, thereby obtaining a 20 kW CCR with a maximum output current of 12 A.

The electric connection of the power modules 13-1 to 13-$n$ in the above described series or parallel connections, is advantageously a hard-wired connection.

Hence, according to the invention, all the power module outputs are configured to contribute to achieving the CCR (global) output 12.

There are different ways for obtaining a co-operation between the power modules 13 to achieve the predetermined CCR power output 12, which is set externally, such as by an airport control tower, or an operator.

An advantageous way for obtaining such a co-operation between power modules is based on a masterless (or multimaster) data communication protocol. This means that none of the power modules would act as a master module determining the contribution level of each power module to the CCR output, but rather each power module is situated at a same level in the power module hierarchy and each power module self-determines its proper module output level 139 based on the predetermined output of the whole CCR 10 (output of all power modules 13) and on the output set by the other power modules. This is achieved by letting the power modules 13 almost constantly communicate with one another to obtain an efficient co-operation.

An alternative way for obtaining co-operation and communication between the modules is based on a master-slave data communication protocol. In such a protocol, the master advantageously can change automatically in case a power module 13 is added to or removed from the CCR 10. By way of example, when a power module 13 is added to the CCR, it automatically receives an address for data communication, which can be based on a serial number or unique identifier of any of the power module's components. The address can therefore be hardware implemented. The address is compared to the addresses of the other power modules, and the protocol can describe that e.g. the power module having the lowest or highest address acts as master governing the data communication, the other modules being slaves. Such a procedure ensures that in case of failure of the current master, the CCR can continue to operate by automatically providing a new master.

A master-slave protocol, wherein the master can automatically be re-assigned can also be referred to as a masterless protocol.

To implement any of the above protocols, CCR 10 advantageously comprises a communication network 17 linked to all the power modules 13. Communication network 17 can be implemented with any topology, and advantageously as a communication ring. It can be implemented e.g. as a CAN-bus.

In order to allow for an exchange and proper interpretation of the information, each power module 13 is provided with a microprocessor (microcontroller) 231 linked to communication network 17 over a data communication port 233. Microcontroller 231 may be operable to control the input stage circuits 132-134. Possibly, power module 13 comprises a second microprocessor (microcontroller) 232 operable to control the output stage circuits 136-138. The output stage microprocessor 232 may communicate with the input stage microprocessor 231 and with the communication network 17 either directly, or, as shown in FIG. 2, through the input stage microprocessor 231. It is possible to integrate the output stage microcontroller 232 in the input stage microcontroller 231. Galvanic insulation between the two microprocessors 231-232 can be obtained through opto-isolators 234 and/or optical transmission of data.

In case the master-slave data communication protocol discussed above is implemented, the address allotted to each power module can be based on an electronic signature of the microcontroller's chip, which is a unique identifier.

Communication network 17 can further be linked to a remote control interface 18 provided in CCR 10 and configured for establishing remote connection with any remote control entity, such as an airport control tower. Communication network 17 can be linked to a man-machine interface 19 provided in CCR 10 and allowing an operator to control CCR operation, e.g. during maintenance service.

Communication network 17 is advantageously implemented with a dedicated shared data structure which contains information relevant to the different pieces of equipment. The power modules 13 and other components of the CCR 10, such as the remote control interface 18, are allowed to manage the shared data structure under some priority rules.

Hence, a modularity is obtained, wherein, advantageously, CCR 10 is allowed to operate even when one or more power modules are out of service. It is even possible to provide one or more redundant power modules 13 which can promptly be put in service in the event of failure of another power module. These features can be implemented in a software program which is run on the microcontroller 231.

Advantageously, the implemented data structure allows each piece of equipment, and in particular the power modules 13, understand how the CCR 10 is assembled, such as understanding how many power modules are present in the CCR and how they are connected. Advantageously, the implemented data structure allows for adding power modules or other pieces of equipment without requiring reprogramming the CCR 10. Advantageously, the implemented data structure allows for optimizing the global power efficiency of the CCR by adapting the outputs of individual power modules. This will lead to energy savings and hence environment-friendly operation. Advantageously, the implemented data structure allows for reconfiguring the system in case of a fault, such as when a power module goes down, the remaining power modules could provide the missing output power.

An example co-operation between power modules 13-1 to 13-$n$ can be as follows. An airport control tower (not shown) sets a predetermined brightness level (e.g. between 1 and 5), which is converted to a current output level of CCR 10, which arrives through remote control interface 18 on the communication network 17. The new set-point is read by all the microcontrollers 231 of power modules 13-1 to 13-$n$. Depending on the data communication (network) protocol, the microcontrollers 231 may either begin communicating with one another over the communication network 17 such that each microcontroller 231 establishes an output level 139 for its proper power module 13, or the microcontroller 231 of the master power module may determine the output levels 139 for each (slave) power module upon reading the new brightness level. Considering by way of example a CCR having three identical power modules with rated output current of 6.6 A at 757 V connected in parallel, then the maximum (rated) global output of the CCR as explained above is 20 A at 757 V. Now, let the CCR output current level be set at 15 A. then the microcontrollers 231 and possibly 232 will communicate with one another to eventually set the output level of each power module to 5 A. When the control tower would set the CCR output current level at 7 A, possibly the system could decide to operate two power modules at an output current level of 3.5 A, and to keep one power module inactive, since it is more efficient to operate a power module at levels close to rated output level. Such control algorithms can advantageously be software-implemented in the microcontrollers 231 of power modules 13 according to the invention.

By so doing, advantageously, the CCR output level can attain the set (predetermined) level within a few milliseconds.

The power modules 13-1 to 13-*n* connected in series and/or in parallel in CCR 10 are advantageously synchronized to provide current and voltage outputs 139 which are advantageously in-phase with the line input. This allows for sinking a maximal output power at same time instants when the input power from the line input is maximal. Advantageously, each module provides for a proper synchronization between the output signal (at output 139) and the input signal (at input 131). To do so, each module may comprise a phase detector, possibly coupled to the input filter 132 and each microcontroller 231 may read a line phase timing from the phase detector.

A possible way of obtaining synchronization between the output signal (at output 139) and the input signal (at input 131) is by reading/detecting the zero crossings of the input signal by the microcontroller 231. A signal synchronous with the detected zero crossings is constructed by the microcontroller 231 (or, as the case may be, the output stage microcontroller 232). Such a signal is advantageously a square wave at the input line frequency, e.g. 50 Hz or 60 Hz. This signal can be used by the output stage circuits to generate an output sine wave with the same zero crossings.

CCR 10 advantageously comprises an output measuring unit 16 configured for measuring parameters of the power output 12 of CCR 10, such as voltage and current levels, phase information and frequency, and other parameters relevant to module operation such as load inductance and resistance to earth. Output measuring unit 16 is advantageously linked to the communication network 17, allowing the measured information to be fed back to the power modules 13, so that they may adapt their outputs 139.

Output measuring unit 16 may be configured for measuring an output parameter representative of phase information of the output signal. Output measuring unit 16 may comprise circuitry, such as a microprocessor, to interpret the measured output parameter in order to calculate the resistive part and the reactive part of the load. This information can be sent over the communication network 17 to microcontrollers 231 which could adapt the output parameters, such as the shape of the output power wave, to the different kinds of field (light) circuits (resistive, inductive or capacitive).

Advantageously, output measuring unit 16 is configured to measure one or more parameters of the CCR power output 12 at time intervals smaller than or equal to 100 μs, such as about 50 μs. The time interval between measurements can be smaller than or equal to 5 μs, advantageously between 1 μs and 3 μs.

Advantageously, the modules 13 are configured for reading phase-related data fed by measuring unit 16 and for using the phase-related data for phase synchronization of the output.

This phase synchronization based on "external" data (with regard to each module) can be provided in addition, or in alternative to the "internal" phase synchronization between the line input and the module output as described above. In case of addition, the phase synchronization based on the "external" data can allow for improving the accuracy of the "internal" synchronization.

It will be convenient to note that since the CCR output is a low frequency AC signal, typically of 50 or 60 Hz, synchronization time is not critical.

Advantageously, the power modules 231 are provided with a software program, which when run on the microcontrollers 231, is configured to operate at least the input stages of the power modules, and advantageously both the input and the output stages. By so doing, an enhanced system control is obtained compared to the prior art, which increases flexibility and reliability. This flexibility, which is in part based on a software implementation of some functions, allows the CCR to operate in different modes according to customer requirements. A "green mode" can be implemented by switching a module completely off in case of low power output of the CCR is desired. In case speed is required, all the modules can be kept always on to ensure fast reaction times. Other modes can be implemented by updating the software program without any change in the hardware.

Advantageously, the microcontroller can be programmed to implement one or more digital P/PI/PID feedback loops. Such digital control loops have the advantage that the signals can be digitally filtered before being applied in the control (feedback) loop, which enables to work reliably even in a highly noisy environment. To this end, the power module 13 advantageously comprises one or more analog to digital converters (ADC) to provide for (one-way) communication from the different blocks in both the input stage (blocks 132-134) and the output stage (blocks 136-138) to the microcontroller(s) 231 (and 232). The ADCs and any possible DACs are represented by blocks 236 in FIG. 2.

It will be convenient to note that communication from the microcontroller to the input/output stage blocks is typically digital. Since the electronic circuits in blocks 133, 134, 136, and/or 137 can be controlled by pulse with modulation (PWM), signals going out from the microcontroller in principle do not require any analog conversion. Alternatively, digital to analog converters (DAC) may be provided for two-way communication with the microcontroller 231 (and 232) as circumstances may require.

One such PID feedback loop can be implemented between the power inverter block 134 and the rectifier block 133. Microcontroller 231 may be programmed to read and analyse actual signals from either blocks 133 and 134 digitally in order to provide for necessary control. By way of example, in case the power inverter block 134 is a LLC resonant converter circuit, a signal connection with the microcontroller can be configured to feed the actual bus voltage of the resonant bridge to the microcontroller. The microcontroller can be programmed to compare it digitally with the target bus voltage. Based on the difference, the microcontroller can be programmed to determine and/or adapt a pulse width modulation (PWM) scheme (duty cycle, frequency) for being applied to the rectifier 133 in order to compensate for the difference. By so doing, a satisfactory power factor can be obtained in every condition. Additionally, the microcontroller can be programmed to control a bus voltage of any of the output stage circuits (blocks 136, 137 or 138) by adapting the PWM scheme applied to rectifier 133.

Advantageously, the microcontroller 231 can be programmed to apply a PWM signal to each of the two branches of the LLC resonant converter bridge in block 134, which signal can be different between the two branches. This can be obtained by implementing a second PID feedback loop in the microcontroller 231, in addition to the one discussed above. The first PID feedback loop is used for low load and controls the phase shift between the two PWM signals provided to the two branches of the LLC resonant bridge 134. For higher loads, if the target voltage has not been reached at 180° phase shift (i.e. maximum output of the first PID feedback loop), the second PID feedback loop comes into action in order to further increase the output voltage. It reduces the PWM signal frequency of both branches until the desired bus voltage is attained (is read by the microcontroller 231), maintaining a 180° phase shift.

Additional digital PID feedback loops can also be implemented in the software program configured to run on microcontroller 231/232 in order to control the bus voltage of any one of the output stage circuits 136-138. To this end, use can be made of pulse width modulation in the output stage bridges 136 and/or 137 as is known in the art. The signal connections between bridges 136/137 and the microcontroller 231/232 can be provided through ADCs similar to the input stage.

Advantageously, a set of different PWM signal schemes can be stored in the microcontroller and applied by it in function of the output waveform, from a DC output to a high frequency AC output.

Power modules 13 according to the invention are advantageously built such that they can be mounted into standard racks. CCRs of different rated outputs according to the invention can be assembled utilising a same rack size, simply by adding one or more power modules to the rack. Whereas previously a manufacturer would have needed different transformers and different voltage conversion boards for CCRs of different output ratings, according to the present invention all kinds of CCRs can be assembled based on one and the same power module, which drastically cuts stocks and economizes manufacturing. Furthermore, operating the transformers within a power module at high frequency further allows for reducing size and weight of the power modules, such that CCRs according to the invention have at least similar and advantageously decreased dimensions and weight than prior art CCRs.

Power modules 13 advantageously have a power output rating smaller than or equal to 10 kVA, advantageously smaller than or equal to 8 kVA, advantageously smaller than or equal to 6 kVA. The power output rating of power modules 13 is advantageously at least 1 kVA, advantageously at least 2 kVA. Indicated rating values are on resistive load. Constant current regulators according to the invention advantageously comprise between one and ten power modules, advantageously between one and six.

The invention claimed is:

1. A constant current regulator for supplying a series circuit of an airfield lighting installation with an AC output electrical power corresponding to a predetermined output power, comprising a plurality of modules configured to be electrically connected for simultaneous operation to jointly provide the output power, the modules being each configured for providing a module output power contributing to the output power of the regulator, wherein each module comprises a proper transformer for providing galvanic insulation as required by local standards, and a microcontroller for controlling operation of the module and in that the constant current regulator comprises a data communication network configured to be connected to the microcontrollers of the modules, wherein the microcontrollers are operable to exchange data over the data communication network so as to make the constant current regulator modular, allowing for one of a group consisting of adding a new module to and removing a module from the constant current regulator.

2. The constant current regulator of claim 1, wherein each transformer has a primary side and a secondary side, and each module comprises:
   an input stage circuit configured for being connected to a power supply line and connected to the primary side of the transformer, wherein the input stage circuit is operable to provide the primary side of the transformer with an AC voltage of a frequency higher than or equal to 1 kHz, preferably higher than or equal to 10 kHz, preferably higher than or equal to 20 kHz, and
   an output stage circuit connected to the secondary side of the transformer and configured to provide the module output power.

3. The constant current regulator of claim 2, wherein the output stage circuit comprises a power inverter operable for switching at a frequency of at least 10 kHz, preferably at least 20 kHz.

4. The constant current regulator of claim 2, wherein each module comprises one or more analog to digital converters and one or more signal connections between the microcontroller and one or more input stage circuits through the one or more analog to digital converters, wherein the microcontrollers are operable to control operation of the one or more input stage circuits based on signals received through the one or more signal connections.

5. The constant current regulator of claim 1, wherein each module comprises means for acquiring phase information relating to a power input of the module, and wherein each module is configured to synchronize a module power output based on the acquired phase information.

6. The constant current regulator of claim 1, comprising means for acquiring phase information relating to a power output of the regulator, for supplying the modules with the acquired regulator power output phase information, and wherein each module is configured to synchronize a module power output based on the acquired regulator power output phase information.

7. The constant current regulator of claim 1, wherein the modules have identical rated maximum output powers.

8. The constant current regulator of claim 1, wherein the microcontrollers and the data communication network are configured to implement a data communication protocol allowing automatic reconfiguration of the constant current regulator when modules are added or removed.

9. The constant current regulator of claim 8, wherein the data communication protocol is configured to assign an address to each module for data communication over the communication network.

10. The constant current regulator of claim 8, wherein the data communication protocol is configured to implement a master-slave communication protocol, wherein one module acts a master for communication over the network and wherein the master module is automatically changed.

11. The constant current regulator of claim 10, wherein the data communication protocol is configured to assign an address to each module for data communication over the communication network, wherein the data communication protocol is configured to select the master module based on the assigned address.

12. The constant current regulator of claim 9, wherein the address assigned to each module is a fixed address, preferably a hardware-implemented address.

13. The constant current regulator of claim 1, wherein the communication network is operable for data communication between the modules based on a shared data structure.

14. The constant current regulator of claim 8, wherein the modules are configured for data communication between the modules over the communication network based on a masterless data communication protocol, and wherein each module is configured for determining each module's proper contribution to the regulator's output power based on the data communication.

15. The constant current regulator of claim 1, comprising a remote control interface configured for being connected to the communication network and operable to establish a remote connection for setting the predetermined output power.

16. The constant current regulator of claim 1, comprising an output measuring unit configured for being connected at an output side of the regulator and operable to measure one or more regulator output parameters, such as signal phase information, and to feed the one or more parameters back to the modules.

17. The constant current regulator according to claim 16, wherein the measuring unit's one or more output parameters are fed back over the communication network.

18. The constant current regulator of claim 1, wherein power outputs of at least two of the modules (13) are connected in series.

19. The constant current regulator of claim 1, wherein power outputs of at least two of the modules (13) are connected in parallel.

20. The constant current regulator as in claim 1 wherein the module further comprising a data communication port connected to the microcontroller, wherein the microcontroller is implemented with a data communication protocol programmed to communicate over the data communication port with at least one other module in order to determine the module output power.

* * * * *